Jan. 9, 1951 A. J. RANDA 2,537,703
COMBINATION HOSE CLAMP AND SUPPORT
Filed Oct. 4, 1948
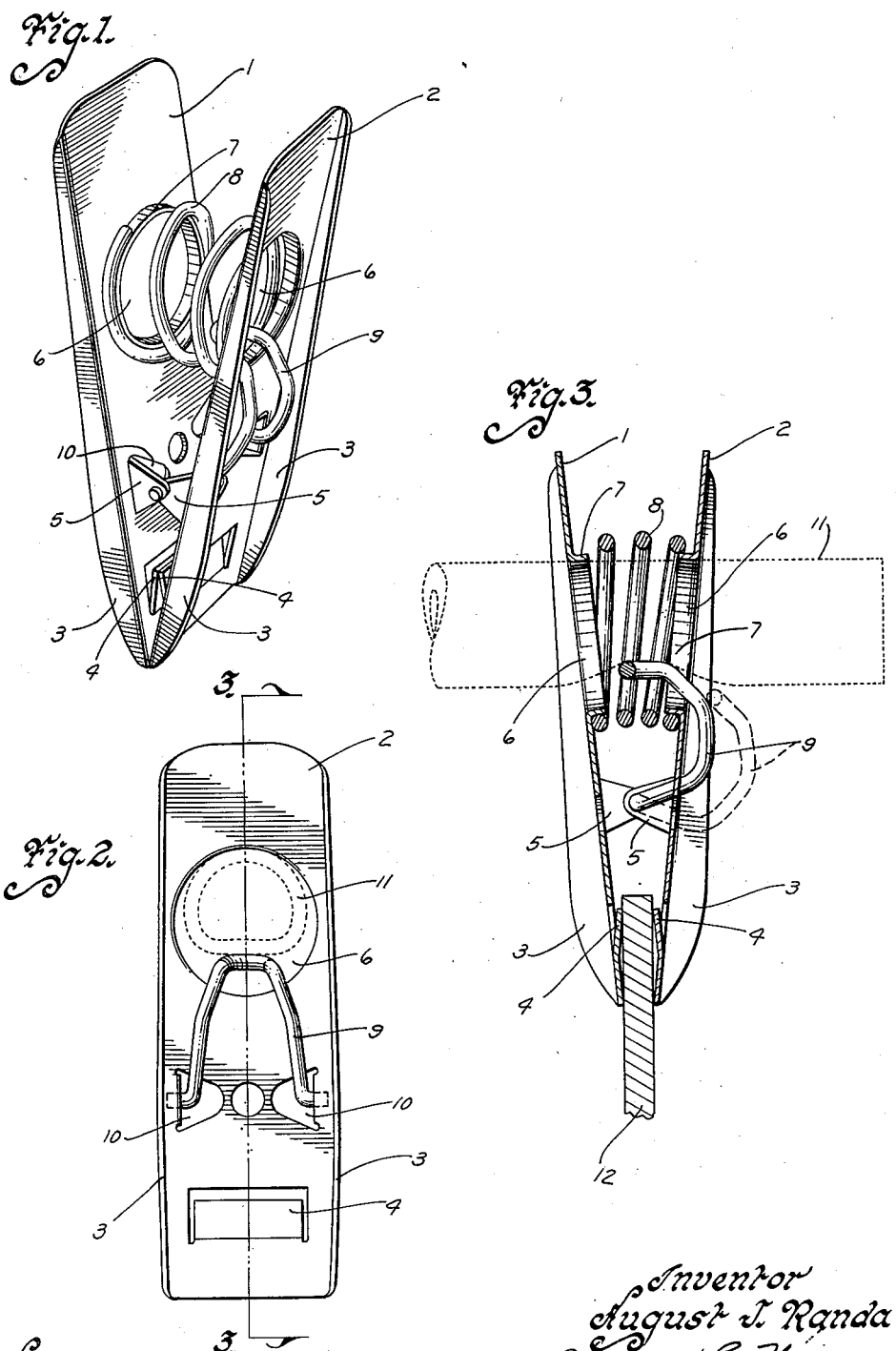

Patented Jan. 9, 1951

2,537,703

UNITED STATES PATENT OFFICE 2,537,703

COMBINATION HOSE CLAMP AND SUPPORT

August J. Randa, Des Moines, Iowa

Application October 4, 1948, Serial No. 52,722

1 Claim. (Cl. 24—81)

This invention relates to a hose clamp and supporting member and more particularly to a clamp member to receive and attach a flexible hose thereto and said clamp member in turn attached to a supporting member.

It is an object of the invention, among others, to provide a combination clamp and support member for a flexible hose member in order to guide and control the discharge end of the flexible hose.

It is a further object of the invention to provide a combination clamp and support member for a flexible hose that is simple in construction and operation, easy to operate and economical both in construction and operation; a combination clamp and support member for a flexible hose that is long lasting and more durable in operation, requiring less repair and lost time in operation; a combination clamp and support member for a flexible hose that is easy to operate, simple in design and easy of repair in case of breakdown and requiring no special skill on the part of a user to mount on a support; and a combination clamp and support member for a flexible hose that can be supplied at an economical price.

With the foregoing and other objects in view, the invention will be more fully described herewith and will be particularly pointed out in the claims appended hereto.

In the drawings, wherein like symbols refer to like or corresponding parts throughout the several views:

Figure 1 is a perspective view of the hose clamp and supporting member.

Figure 2 is a side view of the hose clamp and supporting member with a hose shown in dotted lines.

Figure 3 is a sectional view taken on the line 3—3 of Figure 2.

The clamp is made up of two sections 1 and 2 which sections 1 and 2 pivot near the bottom ends thereof. The sections 1 and 2 are made of sheet metal of any suitable metal with each section 1 and 2 having edge reenforcing rims 3. The lower portion of each section 1 and 2 has a portion 4 stamped therefrom to provide a clamping part. Still within the lower portion of each section are wings 5 stamped from the main body of the sections 1 and 2 to provide hinging points for the sections 1 and 2. The upper portions of the sections 1 and 2 have openings 6 stamped into the sections with rims 7 around the openings 6.

The two sections 1 and 2 are placed together with the wings 5, having openings in the ends thereof (not shown), coinciding and a pin attaching the two sections 1 and 2 together pivotally. A spring 8, in the form of a coil spring has its ends over the rims 7 and exerts a pressure to pivot the upper ends of the sections 1 and 2 about the pivot point and hence keep the lower ends of the sections 1 and 2 closed.

A second spring 9, arcuate in shape and generally bent into a U-shape is provided with the ends of the spring 9 forming the pins for holding the two sections 1 and 2 together and providing the pivot point. The spring arms 9 pass through the openings 10, in the sections 1 and 2 where the wings 5 have been bent outwardly and the closed portion of the U passes through the opening 6 and extends into the spring 8.

In operation, a flexible hose member is represented at 11 and is threaded through one opening 6 in the section, the interior of spring 8 and the opening 6 in the other section 1. The spring 9, while the hose 11 is being threaded into the openings 6 and spring 8, is pulled to the dotted line position of Figure 3 in order to allow sufficient opening to get the hose 11 into the clamp without a great effort. When sufficient hose 11 has been pulled through the clamp, the spring 9 is manually swung to a position where the spring will intersect the plane of the hose opening to clamp a hose member carried by the hose openings.

The sections 1 and 2 may be grasped and pinched together to pivot the two sections 1 and 2 about the pivot point and thus separate the lower portions of the sections 1 and 2. The clamp may then be mounted on a supporting member 12.

It is understood that the invention has been described for purposes of illustration and explanation and that changes and variations are possible without departing from the scope of the invention; all such modifications and changes are intended to be included in the appended claims.

I claim:

In a device of the class described, a bar member having a hose opening in its upper portion, a second bar member having a hose opening in its upper portion, a pierced bearing ear on each of the two sides of each of said bar members; said two ears on one of said bar members overlapping the two ears respectively of the other said bar member, a U-shaped rod member having its two free ends bent to extend through the two pairs of ears of said bar members for hingedly securing said two bar members together; said U-shaped rod member capable of being manually swung to a position where it intersects the plane of a hose opening of at least one of said bar members, and a means for yieldingly holding one end of said first mentioned bar member toward the comparable end of said second bar member.

AUGUST J. RANDA.

REFERENCES CITED

The following references are of record in the file of this patent:

UNITED STATES PATENTS

| Number | Name | Date |
|---|---|---|
| 1,259,458 | Norris | Mar. 12, 1918 |
| 1,942,701 | Hilton | Jan. 9, 1934 |
| 2,171,665 | Meltzer | Sept. 5, 1939 |